Figure 1:
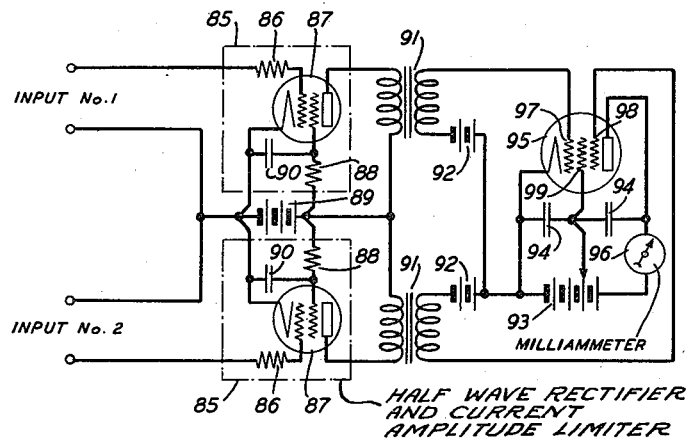

June 23, 1942.    R. A. HEISING    2,287,174
RELATIVE PHASE MEASURING CIRCUIT AND METHOD
Filed Sept. 16, 1939

INVENTOR
R.A. HEISING
BY E. V. Griggs
ATTORNEY

Patented June 23, 1942

2,287,174

UNITED STATES PATENT OFFICE 2,287,174

RELATIVE PHASE MEASURING CIRCUIT AND METHOD

Raymond A. Heising, Summit, N. J., assignor to Bell Telephone Laboratories, Incorporated, New York, N. Y., a corporation of New York Application September 16, 1939, Serial No. 295,220

7 Claims. (Cl. 172—245)

This invention relates to the art of phase and frequency measurement. More particularly, it relates to a method of and means for determining the relative phase or frequency of two alternating currents.

This application is a continuation in part of my copending application, Serial No. 142,809 filed May 15, 1937, relating to an ultra-short wave altimeter for aircraft which matured into Patent 2,183,399, December 12, 1939.

The method of this invention comprises the steps of eliminating the negative half cycles of both the alternating currents to be compared, limiting the remaining pulses to produce a substantially "square-topped" shape of uniform base and amplitude for all the pulses and determining the degree to which the series of pulses derived from one current "overlap in time" the series of pulses derived from the other current to indicate the relative phase of the two currents. If the frequencies are not identical the phase relation between them will constantly change and, as will be explained hereinafter, its rate of change is a measure of the frequency difference.

In the preferred embodiment of the invention, to be described in detail hereinafter, each of the two alternating currents, the relative phase of which is to be determined, is passed through a half-wave vacuum tube rectifier whereby the positive pulses are selected. The resulting half-cycle pulses are limited in amplitude without change of base by the same vacuum tube to produce for each current, a series of "square-topped" pulses, the amplitude of each pulse being the same for both series of pulses, the base for each pulse being substantially one-half cycle wide. The two series of pulses are then impressed upon the two control grid circuits, respectively, of a circuit including a pentode vacuum tube, the pentode tube circuits being biased so that substantially no current flows in the pentode plate circuit, unless positive pulses are simultaneously impressed upon the two control grids. The current flowing in the plate circuit is therefore a straight line function of the phase displacement between the two applied alternating currents.

An object of the invention is to provide an improved method of determining the relative phase of two alternating currents of like frequency.

Another object is to provide a relative phase indicating device which is substantially free of mechanical inertia.

A further object is to provide a relative phase indicating device the phase indication of which is substantially independent of the amplitudes of the currents being compared.

An additional object is to provide a relative frequency indicating device.

Figure 2:
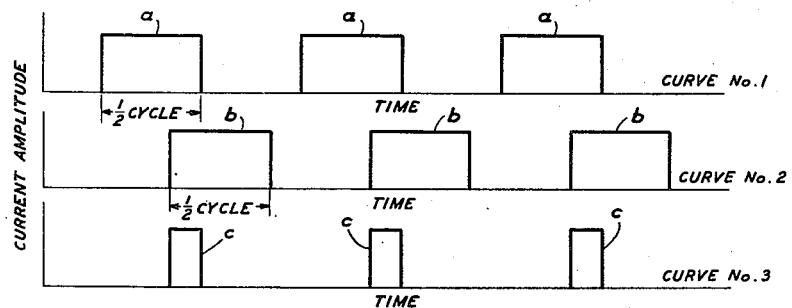

Other objects will become apparent during the course of the following description and in the appended claims. The invention may be more readily understood in connection with the accompanying drawing in which:

Fig. 1 shows an electrical schematic diagram of a preferred embodiment of the relative phase indicating device of this invention; and Fig. 2 is illustrative of the operation of the device of Fig. 1.

In more detail the device of Fig. 1 comprises two vacuum tube half-wave rectifiers and current amplitude limiters 85, one suitable form well known in the art being shown, comprising a four-element vacuum tube 87, resistances 86 and 88 and condenser 90. Battery 89 supplies both of the half-wave rectifiers and current amplitude limiter tubes with low direct current voltages. These half-wave rectifiers and current amplitude limiters have impressed upon their control grids two different signals and convert them into successions of square-topped pulses of identical amplitude and duration substantially as illustrated in Fig. 2. In the case of the tube 87 connected to input No. 1, a high frequency voltage is impressed through resistance 86 associated therewith onto the grid filament circuit. This combination acts to help the limiting action. The potentials on the screen grid, anode and control grid and the tube constants are such that average current flows between anode and cathode with no high frequency impressed. When the potential of the control grid is raised in a positive direction, the current between plate and cathode is increased but at the same time current flows from the grid to the cathode and such current flow produces a potential drop in resistance 86 such that the potential between the grid and the cathode does not follow the sine wave form, but rises rapidly to a value that produces suitable grid-cathode current, and remains at substantially this value during the positive half cycle. During the negative half cycle, the grid potential can follow the input sine wave. The distorted wave form on the grid then produces a substantially rectangular wave formed current increase during the positive half cycle and the current falls to zero during the negative half cycle. This results in a current wave form substantially as indicated by curve No. 1 of Fig. 2. Similarly, a different high frequency wave impressed upon input No. 2 which, when measuring a steady-state condition, is of the same frequency as that on input No. 1, but different in phase, operates upon the second vacuum tube 87 and produces a rectangular-shaped space current substantially as indicated by curve No. 2 of Fig. 2. Both tubes 87 operate only upon that half of their input waves which sends their respective grids in increasing positive potential directions. Grid resistances 86 are made sufficiently large so that suitable flattening of the wave form occurs. Tubes 87 also are chosen such that their grid cathode resistance when the grid becomes positive is sufficiently low and the tubes are always operated at temperature saturation. The two series of pulses thus obtained, substantially as illustrated in Fig. 2 by pulses *a* of curve No. 1 and pulses *b* of curve No. 2, respectively, are applied to the control grids of the pentode vacuum tube 95 through transformers 91. The control circuits of pentode 95 are so arranged that the plate current will increase only when both control grids 97 and 98 are receiving positive pulses, that is, during the intervals over which the pulses *a* of curve No. 1 and pulses *b* of curve No. 2 of Fig. 2 are coexistent. The plate current of the pentode 95 will then consist of a series of pulses *c* substantially as indicated by curve No. 3 of Fig. 2. The current flowing through milliammeter 96 shown in Fig. 1 in the plate circuit of the pentode 95 will therefore be a straight line function of the phase displacement between the pulses *a* of curve No. 1 and the pulses *b* of curve No. 2 of Fig. 2.

The device of Fig. 1 may therefore be employed as a synchroscope to indicate the phase relation between two alternating currents of like frequency and since its operation is substantially dependent upon electronic means only, it may readily be made to operate at much higher frequencies than synchroscopes employing moving mechanical parts having appreciable mass.

If the two alternating currents applied to the device of Fig. 1 are not of like frequency the output or plate circuit current of the pentode 95 will alternately increase and decrease at a frequency corresponding to the frequency difference, or beat note, between the two input currents. The frequency rate at which the plate current varies is therefore an indication of the difference in frequency between the two input currents. This may be determined by counting the number of times the pointer of meter 96 swings to a maximum during a measured time interval or where the frequency difference is relatively large it may be more readily observed by substituting for meter 96 a pulse counting device or a "frequency meter circuit" with an associated "frequency meter" such, for example, as is disclosed in copending application Serial No. 240,739 of R. C. Newhouse filed November 16, 1938 which matured into Patent 2,247,662 on July 1, 1941, relating to a radio terrain clearance indicator for aircraft. An alternative arrangement which may be employed for this purpose is that shown in Fig. 5 of Patent 2,113,011 issued April 5, 1938, to E. L. C. White.

Numerous other applications of the principles of this invention will occur to those skilled in the art and no attempt has here been made to exhaustively cover such applications. The scope of the invention is defined in the following claims.

What is claimed is:

1. The method of determining the relative phase of two alternating currents of the same frequency comprising rectifying each current to obtain one-half only of each cycle, passing each rectified current through an amplitude limiting device to produce substantially square-topped impulses of a particular amplitude and measuring the degree of overlap in time of the pulses derived from one current with respect to those derived from the other current to obtain an indication of the phase relation between said currents.

2. A relative phase indicator for two currents of like frequency including two half-wave rectifiers and current amplitude limiters, each of said currents being passed through one of said rectifiers and current amplitude limiters respectively, a circuit including a pentode vacuum tube having two control grids and a meter in the plate circuit of said pentode vacuum tube and suitable bias voltage sources in said grid and plate circuits, respectively, the said two control grid circuits being so biased that the plate current of said pentode will not increase unless both grid circuits receive positive impulses simultaneously, the outputs of said two half-wave rectifiers and current amplitude limiters being connected to the said two control grid circuits respectively whereby the plate circuit meter reading for said circuit including said pentode vacuum tube indicates the relative phase relation between the two currents.

3. A system for indicating the phase relation between two alternating currents of like frequency including means for severally selecting the positive half cycles only of each alternating current, means for severally converting each series of positive half cycles into a series of square-topped impulses of a particular amplitude substantially coextensive in time with the half cycles from which they were derived, and means for indicating the portion of each cycle during which the square-topped impulses derived severally from said two alternating currents exist simultaneously.

4. A method of determining the phase relation between two alternating currents which comprises eliminating the negative half cycles of the two currents, severally limiting the amplitude of the positive half cycles of each current to produce square-topped pulses of like amplitude substantially coextensive in time with the half cycles from which they are derived, and determining the degree to which the series of pulses derived from one current overlap in time the series of pulses derived from the other current.

5. In a relative phase determining system the method of eliminating possible errors resulting from amplitude variations in two currents to be compared which comprises selecting from each current the half cycle pulses of a particular polarity only and limiting the amplitude of the said half cycle pulses of both the currents to produce from each current a series of square-topped pulses of a particular fixed amplitude.

6. The method of determining the relative frequency of two alternating currents which comprises eliminating the alternate half cycles of each current, limiting the amplitude of the remaining half cycles to form square-topped pulses of uniform amplitude substantially coextensive in time with the half cycles from which they are derived and determining the periodicity of full coincidence in time of the pulses of one current with those of the other current to obtain an indication of the frequency difference between them.

7. A system for indicating the frequency difference between two alternating currents which comprises the combination of the means defined in claim 3 with means for determining the periodicity of the change in the phase relation between the two currents, as evidenced by a periodic change in the portion of each cycle during which the square-topped impulses derived severally from the two currents exist simultaneously.

RAYMOND A. HEISING.